United States Patent
Sakamoto et al.

(10) Patent No.: US 11,941,186 B2
(45) Date of Patent: Mar. 26, 2024

(54) ELECTRONIC PEN

(71) Applicant: Wacom Co., Ltd., Saitama (JP)

(72) Inventors: Ryuto Sakamoto, Saitama (JP); Shinya Aoki, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/983,987

(22) Filed: Nov. 9, 2022

(65) Prior Publication Data

US 2023/0077162 A1  Mar. 9, 2023

Related U.S. Application Data

(63) Continuation of application No. PCT/JP2021/008036, filed on Mar. 3, 2021.

(30) Foreign Application Priority Data

Jun. 1, 2020  (JP) ................. 2020-095316

(51) Int. Cl.
*G06F 3/0354* (2013.01)
*G06F 3/038* (2013.01)
*G06F 3/044* (2006.01)

(52) U.S. Cl.
CPC ........ *G06F 3/03545* (2013.01); *G06F 3/0383* (2013.01); *G06F 3/0442* (2019.05)

(58) Field of Classification Search
CPC ... G06F 3/03545; G06F 3/0383; G06F 3/0442
See application file for complete search history.

(56) References Cited

U.S. PATENT DOCUMENTS

2016/0018912 A1* 1/2016 Kaneda ................. G06F 3/033
345/179

FOREIGN PATENT DOCUMENTS

JP   2015026359 A   2/2015
JP   5761773 B1    8/2015

OTHER PUBLICATIONS

International Search Report, dated Apr. 13, 2021, for International Patent Application No. PCT/JP2021/008036. 12 pages. (with English Translation).

* cited by examiner

*Primary Examiner* — Matthew A Eason
*Assistant Examiner* — Chayce R Bibbee
(74) *Attorney, Agent, or Firm* — Seed IP Law Group LLP (57) ABSTRACT

Provided is an electronic pen including a rod-shaped core body having conductivity, a pen pressure transmitter which is connected to the core body and has conductivity and which, in operation, transmits a pen pressure applied to the core body to a pen pressure detector, and a signal transmitter which, in operation, generates a signal to be transmitted from the core body, in which the pen pressure transmitter includes a shock-absorbing mechanism which, in operation, when the pen pressure applied to the core body has a predetermined value or more, absorbs the pen pressure, and the signal from the signal transmitter, in operation, is supplied to the core body through the pen pressure transmitter and transmitted to an outside of the electronic pen through the core body.

9 Claims, 6 Drawing Sheets

ELECTRONIC PEN

BACKGROUND

Technical Field

The present disclosure relates to an electronic pen that realizes functions as a position indicator for an electronic device such as, for example, a tablet personal computer (PC) in which a position detection device is mounted.

Description of the Related Art

A position detection device and a position indicator are used as one of input devices of various electronic devices such as high-performance telephone terminals called smartphones and tablet PCs. A position indicator is generally formed in a pen shape and called an electronic pen or a stylus. Various methods are available for position detection devices and position indicators. In a case of an active electrostatic (AES) method among those methods, a signal from an oscillation circuit mounted in an electronic pen is transmitted (radiated) from a pen tip toward a position detection sensor of a position detection device to indicate the position on the position detection sensor.

The position detection sensor used in the position detection device using the active electrostatic method includes linear transparent electrodes arranged on a display screen of a display device such as a liquid crystal display (LCD) in the X-axis direction (horizontal direction) and the Y-axis direction (vertical direction) of the display screen. Therefore, the position detection sensor disposed on the display screen serves as an operation surface on which the electronic pen is operated. The position detection device detects the position indicated by the electronic pen according to the positions of the linear transparent electrodes of the position detection sensor receiving the signal (electric field) radiated from the electronic pen.

One example of the related art is disclosed in Japanese Patent No. 5761773.

An information input using the electronic pen is performed by directly bringing the pen tip of the electronic pen into contact with and moving on a position detection surface (operation surface) just like writing on paper with a pencil. The position detection surface is formed by disposing a protective layer such as tempered glass on the position detection sensor. Accordingly, the position detection device can obtain the position indicated by the electronic pen as digital data indicating the handwriting.

Examples of mobile terminals that have been available in recent years include a terminal called a foldable terminal that includes a display screen and that can be folded in two or three. A foldable terminal is compactly portable when folded and can provide a large screen when unfolded. However, since a foldable terminal is foldable, an organic light emitting diode (OLED) display screen mounted as a display device is soft. This is because since the foldable terminal is of a foldable type, a protective layer such as tempered glass cannot be disposed.

Therefore, there is a possibility that a problem occurs when an operation is performed with an electronic pen on an operation surface of the foldable terminal. Even if a pen tip of the electronic pen is formed of a relatively soft material, the pen tip is harder and sharper than a user's fingertip. In this case, a pressure per unit area is much larger than that of a fingertip. When an operation is performed with the electronic pen on the operation surface corresponding to the display screen of the foldable terminal, there is a possibility of damaging the operation surface or a light emitting layer of the display device.

Further, since an electrode for tilt detection is disposed on a pen tip side of the electronic pen, a pen pressure detector is, for example, disposed on a rear end side of the electronic pen. This increases the length of a core body in some cases. In a case of such a long core body, the core body may be bent when a pen pressure is applied to the core body, and the core body may rub against a surrounding wall surface inside a casing of the electronic pen, resulting in loss of the pen pressure. Therefore, it is important to appropriately move the core body in the axial direction according to the pen pressure so that the pen pressure can be appropriately transmitted to the pen pressure detector.

BRIEF SUMMARY

In view of the foregoing, it is desirable to provide an electronic pen that can be reliably used even with a foldable terminal without applying a large pressure on an operation surface of an electronic device on which a position detection device is mounted and that can also appropriately detect a pen pressure.

There is provided an electronic pen including a rod-shaped core body having conductivity, a pen pressure transmitter which is connected to the core body and has conductivity and which, in operation, transmits a pen pressure applied to the core body to a pen pressure detector, and a signal transmitter which, in operation, generates a signal to be transmitted from the core body, in which the pen pressure transmitter includes a shock-absorbing mechanism which, in operation, when the pen pressure applied to the core body has a predetermined value or more, absorbs the pen pressure, and the signal from the signal transmitter, in operation, is supplied to the core body through the pen pressure transmitter and transmitted to an outside of the electronic pen through the core body.

This electronic pen includes the core body, the pen pressure transmitter connected to the core body, and the signal transmitter. The core body and the pen pressure transmitter both have conductivity. A signal from the signal transmitter, in operation, is supplied to the core body through the pen pressure transmitter and transmitted to the outside of the electronic pen through the core body. In this way, functions of the electronic pen are realized. Further, a pen pressure applied to the core body is transmitted to the pen pressure detector through the pen pressure transmitter. The pen pressure transmitter of the electronic pen includes the shock-absorbing mechanism which, in operation, when the pen pressure applied to the core body has the predetermined value or more, absorbs the pen pressure. Therefore, a pen pressure that does not exceed the predetermined value can be appropriately detected. Even if the pen pressure applied to the core body exceeds the predetermined value, it is ensured that an excessive pressure is not applied to an operation surface of a position detection device.

DETAILED DESCRIPTION

Hereinafter, an electronic pen according to an embodiment of the present disclosure will be described with reference to the drawings. The electronic pen according to the embodiment described below supports an active electrostatic method in which a signal is transmitted from the electronic pen and the position indicated by the electronic pen is detected according to the position on a position detection sensor that has received the signal.

Example of Configuration of Electronic Pen 1

Figure 1:
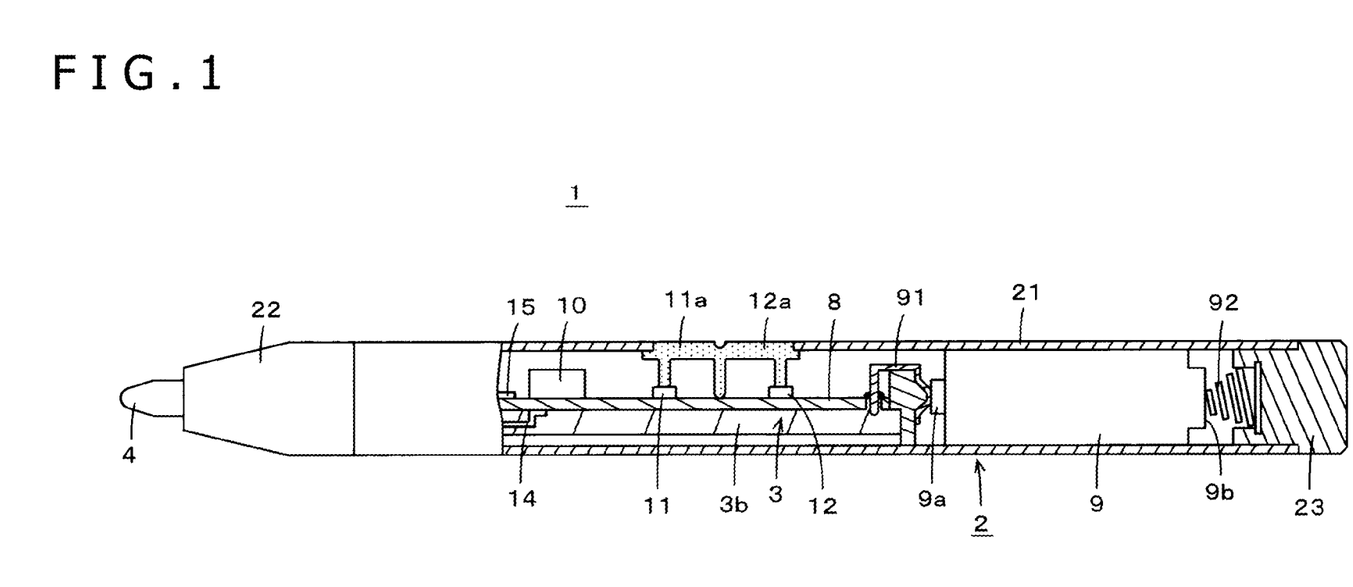
FIG. 1 is a view for describing an example of a configuration of an electronic pen according to an embodiment of the present disclosure.
Figure 2:
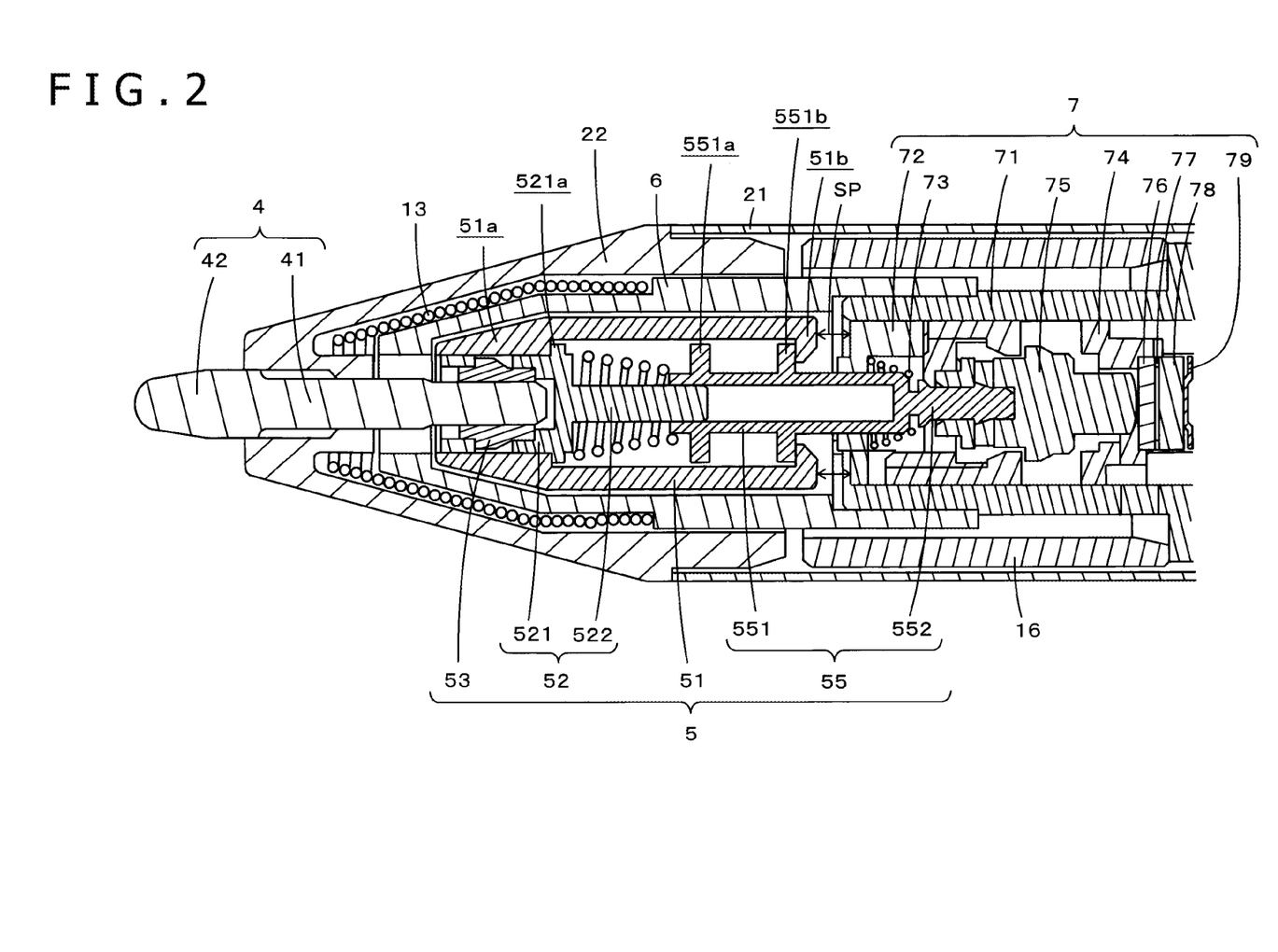
FIG. 2 is a view for describing a main portion on a pen tip side of the electronic pen according to the embodiment of the present disclosure.
Figure 3:
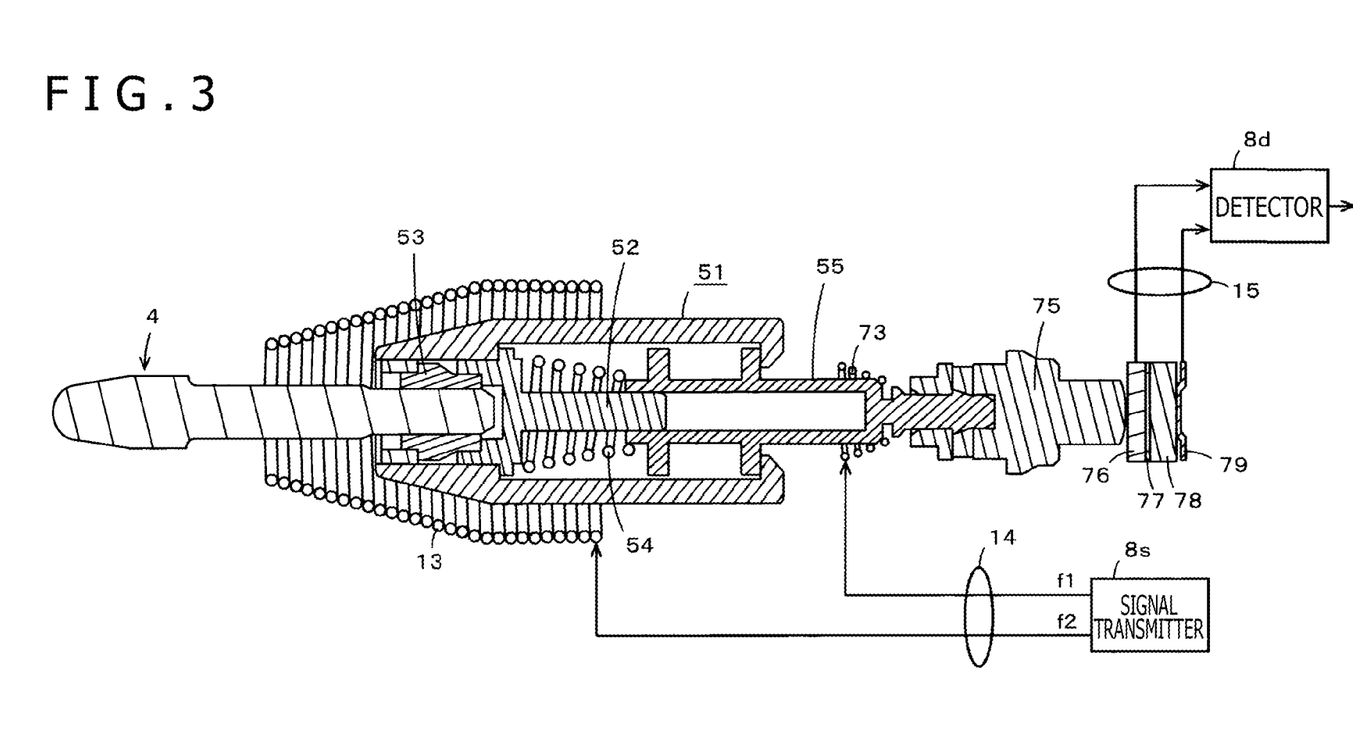
FIG. 3 is a view for describing a portion of the electronic pen according to the embodiment of the present disclosure that realizes pen pressure detection and signal transmission functions.

FIG. 1 is a view for describing an example of a configuration of an electronic pen 1 according to the present embodiment. For the sake of description, part of a case (casing) 2 of the electronic pen 1 is cut off to depict the inside thereof. FIG. 2 is a view (enlarged sectional view) for describing a main portion on a pen tip side of the electronic pen 1. FIG. 3 is a view (schematic view) for describing a portion of the electronic pen 1 that realizes pen pressure detection and signal transmission functions.

As illustrated in FIG. 1, the electronic pen 1 is elongate in the axial direction (the direction along the axis) and includes the case (casing) 2 having a cylindrical shape. One axial end of the case 2 serves as the pen tip side and has an opening, while the other axial end of the case 2 is closed. The case 2 includes a cylindrical case main body 21, a front cap 22, and a rear cap 23. The case main body 21, which has a cylindrical shape, has a hollow portion inside. The front cap 22 and the rear cap 23 are coupled to the case main body 21. The case 2 is formed by fitting the front cap 22 and the rear cap 23 to the case main body 21.

The case main body 21 and the rear cap 23 are formed of a conductive material. In the present embodiment, the case main body 21 and the rear cap 23 are formed of, for example, alumite-processed aluminum. Further, the front cap 22 is formed of a non-conductive material. In the present embodiment, the front cap 22 is formed of, for example, plastic.

As illustrated in FIG. 2, the front cap 22 is formed in a tubular shape having a through hole through which a core body 4 for the electronic pen 1 penetrates in the axial direction. A portion of the front cap 22 on the pen tip side of the electronic pen 1 tapers such that the outer diameter becomes smaller toward a pen tip. In the following description, the core body 4 for the electronic pen 1 will be simply referred to as the core body 4. An end of the front cap 22 on a pen tip side thereof has an opening of the through hole through which the core body 4 penetrates. As illustrated in FIG. 1, a board holder 3, which holds mounted components such as a printed circuit board 8, and a battery 9 are housed in the hollow portion of the case 2, while components for realizing functions as the electronic pen 1 are housed on the pen tip side of the case 2.

As illustrated in FIG. 2, a core body unit 5, an inner casing 6, a pressure-sensitive component (pen pressure detector) 7, a tilt detection electrode 13, and a ground ring 16 are housed on a front cap 22 side of the case 2. As with the front cap 22, the inner casing 6 is formed in a tubular shape and tapers such that the outer diameter becomes smaller toward the pen tip. The inner casing 6 is formed of a non-conductive material. In the present embodiment, the inner casing 6 is formed of, for example, plastic. Further, a small space is formed on the pen tip side and between the front cap 22 and the inner casing 6. The tilt detection electrode 13 is disposed in this space. The tilt detection electrode 13 is formed by winding a conductive wire in a coil shape around an outer side surface of a pen tip side of the inner casing 6.

The core body unit 5 is mounted inside the inner casing 6. The core body unit 5 includes a tubular unit casing 51 inside which a shaft portion 52, a piston spring 54, and a cylinder portion 55 are mounted in order from the pen tip side. The shaft portion 52 includes a core body holding portion 521 and a piston portion 522. The core body holding portion 521 is formed in a cup shape and has an opening on the pen tip side. The piston portion 522 has a columnar shape and extends from an outer side of a bottom surface of the core body holding portion 521 toward a rear end side of the electronic pen 1. The shaft portion 52, which includes the core body holding portion 521 and the piston portion 522, is formed of a conductive material. In the present embodiment, the shaft portion 52 is formed of, for example, metal.

A core body holding member 53, which is formed in a tubular shape, is disposed inside the core body holding portion 521 of the shaft portion 52. As illustrated in FIG. 2, an end surface of the core body holding member 53 on a rear end side thereof abuts against an inner end surface of the core body holding portion 521 on a rear end side thereof. Further, the core body holding member 53 has a projecting portion that projects from a side surface of the core body holding member 53. An end surface of the projecting portion on a pen tip side of the projecting portion abuts against an inner end surface of the core body holding portion 521 on a pen tip side thereof. Accordingly, the core body holding member 53 is fixed inside the core body holding portion 521 of the shaft portion 52.

The core body holding member 53 is formed of a conductive elastic member. In the present embodiment, the core body holding member 53 is formed of, for example, conductive rubber. The core body 4 can be attached to the shaft portion 52 by inserting a rear end side of the core body 4 into the core body holding member 53 and can also be detached from the shaft portion 52 by pulling out the core body 4 therefrom. That is, the core body 4 is detachably attached to the core body holding member 53, which is disposed in the core body holding portion 521 of the shaft portion 52. The core body 4 is formed in a rod shape by a conductive material and includes a main body portion 41 and a pen tip portion 42 as illustrated in FIG. 2.

Further, the piston spring 54 is disposed around the piston portion 522 of the shaft portion 52. The piston spring 54 is formed of a conductive material. In the present embodiment, the piston spring 54 is formed of, for example, stainless steel (SUS304). The cylinder portion 55 is disposed at a subsequent stage of the shaft portion 52 and the piston spring 54.

The cylinder portion 55 includes a cylinder main body portion 551 and a cylinder coupling portion 552. The cylinder main body portion 551 has a tubular shape with a columnar hole extending from the pen tip side toward the rear end side. The cylinder coupling portion 552 has a rod shape and extends from the outside of a bottom surface of the cylinder main body portion 551 toward the rear end side. A rear end of the cylinder main body portion 551 is closed, forming the bottom surface. Further, a first ring-shaped protrusion 551a and a second ring-shaped protrusion 551b are formed on an outer side of the cylinder main body portion 551. The cylinder portion 55 is formed of a conductive material. In the present embodiment, the cylinder portion 55 is formed of, for example, metal.

The diameter of the columnar piston portion 522 of the shaft portion 52 is slightly smaller than the inner diameter of the hole of the cylinder main body portion 551 of the cylinder portion 55. Accordingly, as illustrated in FIGS. 2 and 3, the piston portion 522 of the shaft portion 52 can be inserted into the hole of the cylinder main body portion 551 and slidingly move inside (moves into and moves out of) the cylinder main body portion 551 according to a pen pressure. As illustrated in FIGS. 2 and 3, in a state in which a rear end side of the piston portion 522 is inserted into the hole of the cylinder main body portion 551, the piston spring 54 is in contact with the outer side of the bottom surface of the core body holding portion 521 of the shaft portion 52 and the cylinder main body portion 551 of the cylinder portion 55. Accordingly, the piston spring 54 electrically connects the shaft portion 52 and the cylinder portion 55.

The piston spring 54 is sandwiched between the outer side of the bottom surface of the core body holding portion 521 of the shaft portion 52 and the first ring-shaped protrusion 551a formed on the cylinder main body portion 551 of the cylinder portion 55 and acts between them. In this case, in a state in which a pen pressure that does not exceed a predetermined value is being applied to the core body 4, the piston spring 54 does not contract (bend) and the piston portion 522 is not further inserted into the cylinder main body portion 551. When a pen pressure that exceeds the predetermined value is applied to the core body 4, the piston spring 54 starts to contract (bend), and the piston portion 522 is gradually further inserted into the cylinder main body portion 551 according to the pen pressure.

In this way, the shaft portion 52, the piston spring 54, and the cylinder portion 55 constitute a shock-absorbing mechanism that absorbs a pen pressure that exceeds the predetermined value. As described later, the piston spring 54 according to the present embodiment starts to bend when a load of 300 gf (gram force) is applied. Therefore, the piston spring 54 does not contract (bend) at a pen pressure of less than 300 gf but gradually starts contracting (bending) when a pen pressure of 300 gf or more is applied.

Further, the shaft portion 52, the core body holding member 53, the piston spring 54, and the cylinder portion 55 are housed in the unit casing 51 so as to maintain the state illustrated in FIG. 2. That is, an outer protrusion 521a, which projects in a ring shape from a rear end side surface of the core body holding portion 521 of the shaft portion 52, is engaged with a front-side projecting portion 51a, which inwardly projects on a pen tip side of the unit casing 51. Further, the second ring-shaped protrusion 551b of the cylinder main body portion 551 is engaged with a rear-side projecting portion 51b, which inwardly projects in a ring shape from a rear end of the unit casing 51.

Accordingly, the shaft portion 52, the core body holding member 53, the piston spring 54, and the cylinder portion 55 are each housed in the unit casing 51 so as to maintain the state illustrated in FIGS. 2 and 3. Therefore, the core body unit 5 configured by housing the shaft portion 52, the core body holding member 53, the piston spring 54, and the cylinder portion 55 in the unit casing 51 can be used as a pen pressure transmitter as a component that has conductivity and that transmits a pen pressure applied to the core body. Further, as described above, the core body unit 5 having a function as the pen pressure transmitter includes the shock-absorbing mechanism that absorbs a pen pressure of the predetermined value or more.

In the core body unit 5 configured in this way, the rear end side of the cylinder main body portion 551 of the cylinder portion 55 and the cylinder coupling portion 552 project from the rear end of the unit casing 51 and are coupled to the pressure-sensitive component 7. As illustrated in FIG. 2, in the non-use state in which no pen pressure is applied to the core body 4, a space SP is formed between a rear-side end surface of the unit casing 51 and a front-side end surface of the pressure-sensitive component 7 as indicated by an arrow. As described later, the space SP allows the core body unit 5 to move in the axial direction in the range of a pen pressure of less than 300 gf on the core body 4. With this configuration, a pen pressure of less than 300 gf can be appropriately detected.

The pressure-sensitive component 7 includes a pressure-sensitive casing 71, a casing cap 72, a conductive spring 73, a pressing member holder 74, a pressing member 75, a first electrode 76, a spacer 77, a dielectric 78, and a second electrode 79. The casing cap 72, which has a through hole in a central portion, is fixed to an end of the pressure-sensitive casing 71 on a pen tip side thereof, so that components constituting the pressure-sensitive component 7 stay inside the pressure-sensitive casing 71. The pressure-sensitive casing 71 and the casing cap 72 are formed of a non-conductive material. In the present embodiment, the pressure-sensitive casing 71 and the casing cap 72 are formed of plastic.

The conductive spring 73, which is formed of a conductive material, is disposed inside the pressure-sensitive casing 71 and in the vicinity of the through hole of the casing cap 72. As illustrated in FIG. 2, when the cylinder coupling portion 552 of the cylinder portion 55 and the rear end side of the cylinder main body portion 551 are inserted into the through hole of the casing cap 72, the conductive spring 73 contacts the cylinder main body portion 551 and is electrically connected thereto. The conductive spring 73 realizes a function of supplying a signal to the cylinder portion 55.

The conductive spring 73 is fixed to an inner bottom surface of the casing cap 72 and acts between the rear end side of the cylinder main body portion 551 and the inner bottom surface of the casing cap 72 to push back the core body unit 5 toward the pen tip side. Further, since the conductive spring 73 has a shape of a coil spring, the conductive spring 73 can extend and contract even when the cylinder portion 55 slidingly moves, and typically maintain the electrical connection between the conductive spring 73 and the cylinder main body portion 551.

The pressing member 75, which is housed in the pressing member holder 74, is disposed on a rear end side of the casing cap 72. The pressing member holder 74 and the pressing member 75 are formed of a non-conductive material. In the present embodiment, the pressing member holder 74 and the pressing member 75 are formed of plastic. Further, the pressing member 75 can move in the pressing member holder 74 in the axial direction of the electronic pen 1.

The first electrode 76, the spacer 77, the dielectric 78, and the second electrode 79 are disposed on a rear end side of the pressing member 75. The first electrode 76 is formed of a conductive elastic member. In the present embodiment, the first electrode 76 is formed of conductive rubber. The spacer 77 is formed in a ring shape by a non-conductive material such as plastic. The spacer 77 is disposed to form a space (gap) corresponding to the thickness of the spacer 77 between the first electrode 76 and a front end surface (an end surface on the pen tip side) of the dielectric 78 at the subsequent stage. The dielectric 78 is formed by using, for example, ceramics. The second electrode 79 is disposed in contact with a rear end surface of the dielectric 78.

As illustrated in FIG. 2, the pressure-sensitive casing 71 of the pressure-sensitive component 7 having the above-described configuration is fitted from an opening of the inner casing 6 on a rear end side thereof and fixed to the inner casing 6. In this case, the cylinder coupling portion 552 of the cylinder portion 55 and a portion of the cylinder main body portion 551 on the rear end side thereof are inserted into the pressure-sensitive component 7 through the through hole of the casing cap 72, and the cylinder coupling portion 552 is inserted into and held (fixed) by a hole formed on a pen tip side of the pressing member 75. As illustrated in FIGS. 2 and 3, the rear end side of the core body 4 is inserted into the core body holding member 53, which is fixed inside the core body holding portion 521 of the shaft portion 52, and fixed to the shaft portion 52.

Accordingly, the core body 4, the shaft portion 52, the piston spring 54, the cylinder portion 55, and the pressure-sensitive component 7 are disposed in series in the axial direction of the electronic pen 1. In this case, the pressing member 75, the first electrode 76, the spacer 77, the dielectric 78, and the second electrode 79 are disposed in series inside the pressure-sensitive component 7, constituting a variable capacitor. Therefore, according to a pen pressure applied to the core body 4, the pressing member 75 presses the first electrode 76 to move the first electrode 76 closer to or further from the dielectric 78, thereby changing the capacitance between the first electrode 76 and the second electrode 79. A pen pressure can be detected according to the change in the capacitance.

Although not illustrated in FIG. 2, the pressure-sensitive casing 71 is closed on a rear end side of the second electrode 79. Further, as illustrated in FIG. 1, the pressure-sensitive casing 71 is coupled to the board holder 3, which is disposed inside the case 2 of the electronic pen 1, and fixed inside the case 2. The board holder 3 is formed of insulating resin, for example, liquid crystal polymer. The board holder 3 has a configuration in which when the board holder 3 is housed in the hollow portion of the case 2, a pressure-sensitive component holding portion (not illustrated) and a printed circuit board mounting base portion 3a, which extends in the axial direction of the electronic pen 1 as illustrated in FIG. 1, become continuous in the axial direction.

The pressure-sensitive component holding portion of the board holder 3 is positioned on a pen tip side of the printed circuit board mounting base portion 3a. The pressure-sensitive component holding portion has a circular shape covering a rear end surface of the pressure-sensitive component 7 and has a predetermined thickness. The outer diameter of the pressure-sensitive component holding portion is slightly smaller than the inner diameter of the through hole of the front cap 22. The printed circuit board mounting base portion 3a has a boat-like shape on which the printed circuit board 8 is mounted and held. Specifically, the printed circuit board mounting base portion 3a has a shape as if a tubular body is cut in substantially half in the axial direction.

The entire pressure-sensitive component holding portion and printed circuit board mounting base portion 3a of the board holder 3 are housed in the case 2 such that the pressure-sensitive component holding portion is positioned closer to the main body portion 41 of the core body 4, and fixed therein so as not to move. Accordingly, as illustrated in FIG. 2, the positions of the inner casing 6, the pressure-sensitive component 7, and the ground ring 16 are fixed inside the case 2, and a pen pressure applied to the core body 4 is appropriately transmitted to the pressure-sensitive component 7.

As illustrated in FIG. 1, a terminal conductor 91 is disposed at an end of the printed circuit board mounting base portion 3a of the board holder 3 on a side opposite to the pen tip side of the printed circuit board mounting base portion 3a. The terminal conductor 91 electrically abuts against a positive-side terminal 9a of the battery 9 and is electrically connected to a copper foil pattern of a power supply line of the printed circuit board 8. A coil spring terminal 92, which is formed of conductive metal and is electrically connected to a negative-side terminal 9b of the battery 9, is disposed in a fitting portion of the rear cap 23 fitted to the case main body 21. As illustrated in FIG. 1, the battery 9 is inserted into the case 2 such that the positive-side terminal 9a is connected to the terminal conductor 91. After that, the rear cap 23 is fitted to the case main body 21 so as to press the negative-side terminal 9b of the battery 9 by the coil spring terminal 92.

In the present embodiment, the case main body 21, which is formed of a conductive material, is electrically connected to an earth conductor of the printed circuit board 8 via, for example, the ground ring 16 described above. Since the rear cap 23 and the case main body 21 are formed of a conductive material, the negative-side terminal 9b of the battery 9 is electrically connected to the earth conductor of the printed circuit board 8 via the rear cap 23 and the case main body 21. The positive-side terminal 9a of the battery 9 is connected to the copper foil pattern of the power supply line of the printed circuit board 8 through the terminal conductor 91. Accordingly, a voltage of the battery 9 is supplied as a power supply voltage of a circuit formed on the printed circuit board 8.

A circuit portion including a signal transmitter (signal generation circuit) 8s, a detector 8d, a control integrated circuit (IC) 10 illustrated in FIG. 1, and other peripheral circuit components is disposed on the printed circuit board 8. The detector 8d detects capacitance to detect a pen pressure. The signal transmitter 8s generates a signal to be transmitted from the core body 4 of the electronic pen 1. The control IC 10 constitutes a control circuit that controls transmission of a signal from the signal transmitter 8s to the core body 4. A peripheral circuit portion includes push switches (side switches) 11 and 12 illustrated in FIG. 1. Further, as illustrated in FIG. 3, conductive wires 14 and conductive wires 15 are connected to the printed circuit board 8. The conductive wires 14 connect the core body 4 and the tilt detection electrode 13 to the signal transmitter 8s. The conductive wires 15 transmit the output of the detection of a pen pressure from the pressure-sensitive component 7 to the detector 8d for detecting the capacitance.

Further, as described above, the core body 4, the core body holding member 53, the shaft portion 52, the piston spring 54, the cylinder portion 55, and the conductive spring 73 are each formed of a conductive material and electrically connected to each other. In the electronic pen 1, as illustrated in FIG. 3, a signal is supplied to the conductive spring 73 and the tilt detection electrode 13 from the signal transmitter 8s, which is mounted on the printed circuit board 8, through the two conductive wires 14. That is, a position indication signal of a frequency f1 from the signal transmitter 8s is supplied to the conductive spring 73.

The position indication signal is supplied from the conductive spring 73 to the piston spring 54 through the cylinder portion 55 and then supplied from the piston spring 54 to the core body holding member 53 through the shaft portion 52. The position indication signal is then supplied from the core body holding member 53 to the core body 4 and sent (transmitted) to the outside of the electronic pen 1. The position indication signal sent from the core body 4 is sent toward a position detection sensor of a position detection device mounted on, for example, a tablet PC where the position indication signal is used for detecting the indicated position. Further, a tilt detection signal of a frequency f2 from the signal transmitter 8s is supplied to the tilt detection electrode 13. Then, the tilt detection signal is sent (transmitted) from the tilt detection electrode 13 to the outside of the electronic pen 1. The tilt detection signal sent from the tilt detection electrode 13 is sent toward the position detection sensor of the position detection device mounted on, for example, the tablet PC where the tilt detection signal is used for detecting the tilt of the electronic pen 1.

Further, as illustrated in FIG. 3, the conductive wires 15, which extend from the first electrode 76 and the second electrode 79 of the pressure-sensitive component 7, are connected to the detector 8d, which is disposed on the printed circuit board 8 and which detects the capacitance, and the capacitance that changes according to a pen pressure is detected by the detector 8d. The information indicating the capacitance detected by the detector 8d is supplied to the control IC 10, which is mounted on the printed circuit board 8, and a position indication signal to be sent from the signal transmitter 8s is changed accordingly. Then, the position indication signal including the pen pressure information is sent to the position detection sensor. Accordingly, the position detection device can detect not only the indicated position but also the pen pressure.

Specifically, the control IC 10 of the electronic pen 1 performs control so as to transmit, to the position detection sensor, a burst signal (position indication signal) for coordinate detection (position detection) corresponding to the signal from the signal transmitter 8s. Accordingly, the position detection sensor can detect the position indicated by the electronic pen 1 on the position detection sensor. Further, the circuit including the control IC 10 configured on the printed circuit board 8 of the electronic pen 1 performs pen pressure detection operation based on the capacitance in the pressure-sensitive component 7 during a burst signal transmission period. After the burst signal transmission period ends, the control IC 10 transmits a coded signal, which is obtained by modulating a signal from the signal transmitter 8s according to the detected pen pressure, from the core body 4 and notifies the position detection sensor of the pen pressure. Accordingly, the position detection sensor can also detect the pen pressure applied to the core body 4 of the electronic pen 1.

Further, as described above, the signal transmitter 8s differentiates the frequencies of the position indication signal to be supplied to the conductive spring 73 and the tilt detection signal to be supplied to the tilt detection electrode 13. However, the present disclosure is not limited thereto. The tilt detection signal may be sent at a different timing from the position indication signal and the pen pressure detection signal so that the position indication signal and the tilt detection signal may have the same frequency. Further, in a case of the electronic pen 1 according to the present embodiment, as illustrated in FIG. 2, the tubular ground ring 16, which is formed of a conductive material, is disposed around the pressure-sensitive component 7 and used as a grounding member of an electrical system.

The electronic pen 1 having the configuration described above has functions of indicating the position on the position detection sensor to the position detection sensor, detecting a pen pressure applied to the core body 4, and notifying the position detection sensor thereof. Further, the electronic pen 1 transmits a signal from the tilt detection electrode 13 to the position detection sensor, thereby allowing the position detection sensor to detect the tilt of the electronic pen 1.

Details of Operation of Electronic Pen 1

The electronic pen 1 according to the present embodiment having the configuration described with reference to FIGS. 1 to 3 exhibits functions that are not found in existing electronic pens at the time of use due to its configuration features. One of its configuration features is that the electronic pen 1 includes the shock-absorbing mechanism including the shaft portion 52, the piston spring 54, and the cylinder portion 55. The other configuration feature is that, as indicated by the arrow of FIG. 2, the space SP is formed between the rear end surface of the unit casing 51 of the core body unit 5 and the front end surface of the pressure-sensitive component 7, thereby allowing the core body unit 5 to slide in the axial direction of the electronic pen 1.

First, consider a case where no pen pressure is applied to the core body 4. As described above, the piston spring 54, which is disposed between the shaft portion 52 and the cylinder portion 55, does not contract unless a pen pressure of 300 gf or more is applied. That is, in the state illustrated in FIG. 2, the piston spring 54 with a set load of 300 gf is being strained between the outer side of the bottom surface of the core body holding portion 521 of the shaft portion 52 and the first ring-shaped protrusion 551a, which is formed on the cylinder main body portion 551 of the cylinder portion 55. However, a load of 300 gf is not applied to the pressure-sensitive component 7.

Therefore, when no pen pressure is applied to the core body 4, the piston spring 54 does not contract, and the piston portion 522 does not move toward the rear end side inside the cylinder main body portion 551 of the cylinder portion 55 as illustrated in FIG. 2. Needless to say, the space SP between the rear end surface of the unit casing 51 of the core body unit 5 and the front end surface of the pressure-sensitive component 7 does not change, and the state illustrated in FIG. 2 is maintained.

Next, consider a case where a pen pressure larger than 0 gf and less than 300 gf is applied to the core body 4. In this case as well, since the pen pressure is less than 300 gf, the piston spring 54 does not contract, and the piston portion 522 does not move toward the rear end side inside the cylinder main body portion 551 of the cylinder portion 55. However, the core body unit 5 moves toward the rear end in the axial direction of the electronic pen 1 according to the pen pressure applied to the core body 4, and the distance (space SP) between the rear end surface of the unit casing 51 of the core body unit 5 and the front end surface of the pressure-sensitive component 7 becomes smaller.

As a result, the first electrode 76 is pushed toward the rear end side by the pressing member 75 to which the cylinder coupling portion 552 is connected, and the capacitance between the first electrode 76 and the second electrode 79 changes, allowing the pen pressure to be detected. That is, when a pen pressure applied to the core body 4 is larger than 0 gf and less than 300 gf, the pen pressure can be appropriately detected through the pressure-sensitive component 7. When the pen pressure applied to the core body 4 is released, the core body unit 5 and the core body 4 are pushed back by an elastic force of the first electrode 76 and the action of the conductive spring 73 and return to the initial state illustrated in FIG. 2.

Next, consider a case where a pen pressure of 300 gf or more is applied to the core body 4. In this case, the piston spring 54 with the set load of 300 gf contracts, and the piston portion 522 moves toward the rear end side inside the cylinder main body portion 551 of the cylinder portion 55. Accordingly, the pen pressure of 300 gf or more applied to the core body 4 is absorbed by the shock-absorbing mechanism including the shaft portion 52, the piston spring 54, and the cylinder portion 55. Therefore, for example, even when a pen pressure of 300 gf or more is applied to the core body 4, it is ensured that a load of 300 gf or more is not applied to an operation surface of a tablet PC or the like with which the core body 4 is in contact. This makes it possible to realize the electronic pen 1 suitable for use with a foldable terminal having an operation surface that may be damaged or cause other inconvenience when a load of 300 gf or more is applied.

As described above, in the electronic pen 1 according to the present embodiment, the core body 4, the shaft portion 52, the core body holding member 53, the piston spring 54, the cylinder portion 55, and the conductive spring 73 are all formed of conductive materials and electrically connected to each other. This makes it possible to realize an electronic pen using the active electrostatic method.

Further, the core body 4, the shaft portion 52, the core body holding member 53, the piston spring 54, and the cylinder portion 55 are disposed in series straight toward the pressure-sensitive component 7. This configuration eliminates the need to lengthen the core body 4 itself, allowing the pressure-sensitive component 7 to be pressed straight. Accordingly, the pen pressure can be appropriately detected without loss.

Further, the shaft portion 52, the core body holding member 53, the piston spring 54, and the cylinder portion 55 act as the shock-absorbing mechanism. In the present embodiment, the shock-absorbing mechanism absorbs a pen pressure of 300 gf or more applied to the core body 4. This realizes an electronic pen suitable for use with a foldable terminal in which a protective layer such as tempered glass cannot be mounted on its operation surface, unlike an existing tablet PC that has an operation surface protected by tempered glass or the like.

In the case of the electronic pen 1 according to the present embodiment, when a pen pressure of 300 gf or more is applied to the core body 4, the pen pressure cannot be detected. However, when a tablet PC or the like is used, it is not necessary to apply a pen pressure of 300 gf or more to a core body of an electronic pen in nature. Therefore, even when the electronic pen 1 according to the present embodiment is used with a foldable terminal, no inconvenience occurs. Needless to say, the electronic pen 1 according to the present embodiment can fully exhibit functions as an electronic pen even when used with an existing tablet PC or the like having an operation surface on which tempered glass or the like is mounted.

Improvement of Pen Tip of Core Body 4

The core body 4 of the electronic pen 1 according to the present embodiment is formed of a conductive material. As the conductive material, for example, metal or conductive resin may be used. However, when the core body 4 is formed of one of these conductive materials, the core body 4 becomes thin and hard. As described above, since the electronic pen 1 includes the shock-absorbing mechanism, the electronic pen 1 does not apply a load of 300 gf or more to an operation surface. However, it is desirable to further protect the operation surface. Moreover, it is desirable to make what is called writing feel soft when an operation input is performed using the electronic pen 1. Therefore, in the electronic pen 1 according to the present embodiment, a cover can be disposed at a tip of the pen tip portion 42 of the core body 4.

That is, as illustrated in FIG. 2, the core body 4 includes the main body portion 41 and the pen tip portion 42. The main body portion 41 has a rod (columnar) shape. The pen tip portion 42 is located at one end in the longitudinal direction of the main body portion 41 and has a diameter larger than the diameter of the main body portion 41. Further, the pen tip portion 42 has a tapered shape that tapers from a main body portion 41 side (rear end side) toward the tip. The main body portion 41 and the pen tip portion 42 are integrally formed of the same conductive material. Further, the main body portion 41 and the pen tip portion 42, which have a large diameter, are hard and have high strength. As the conductive material, for example, any of various hard conductive resins, metals such as copper, and the like is used.

A cup-shaped cover 43, which matches the tip of the pen tip portion 42, is disposed at the tip of the pen tip portion 42. The cover 43 is a cup-shaped (dome-shaped) member disposed so as to cover the entire outer surface of the pen tip portion 42, and is formed of a material that can be compressed and expanded. That is, the cover 43 is in the form of a sponge or rubber and has elasticity like a human fingertip (a portion with a finger-print and a portion in the vicinity thereof). Further, the cover 43 has a property of being compressed and contracted when pressed, and expanding and returning to the original state when the pressing is released.

The cover 43 may be in the form of a sponge. For example, the cover 43 may be formed of, for example, a foam sponge, which is formed by foaming a resin material such as urethane resin, or a rubber sponge, which is formed by foaming a rubber material such as natural rubber or synthetic rubber. The cover 43 may be in the form of rubber. In this case, the cover 43 may be formed of, for example, natural rubber, synthetic rubber, or any of other various other materials that have an elastic force as with natural rubber and synthetic rubber and that contract when pressed and return to the original state when the pressing is released. Other materials such as urethane resin or silicon may be used to form the cover 43 capable of compression and expansion. It is also possible to form the cover 43 by overlapping meshed fabrics. In short, the cover 43 can be formed of any of various materials so as to be compressed and contracted when pressed, and so as to expand and return to the original state when the pressing is released, like a sponge or a rubber.

In this way, the cover 43, which can be compressed and expanded, is disposed so as to cover the entire outer surface of the pen tip portion 42. Accordingly, when an operation is performed using the electronic pen 1 on an operation surface on a display screen of an electronic device, a force applied to the operation surface by the electronic pen 1 is absorbed by the cover 43. With this configuration, it is possible to prevent a large force from being momentarily applied to the operation surface, that is, the display screen of the display device mounted on the electronic device and protect the display screen. Therefore, even when the electronic pen 1 according to the present embodiment is used for operation of a foldable terminal, a display screen of the foldable terminal is not damaged. Thus, an electronic pen that is more suitable for use with a foldable terminal can be realized.

The outer surface of the pen tip portion 42 refers to a surface on an outer side of the pen tip portion 42 that can come into contact with the operation surface if the cover 43 is not disposed thereon. The cover 43 is in close contact with the pen tip portion 42 when attached to the pen tip portion 42. In this state, the core body 4 is attached to the electronic pen and the electronic pen to which the core body 4 is attached can be used as an electronic pen. To make the cover 43 more difficult to come off from the pen tip portion 42, the cover 43 may adhere to the pen tip portion 42 with an adhesive.

Variations (Modifications) of Core Body 4

As described above, the cup-shaped cover 43, which covers the outer surface of the pen tip portion 42, is disposed on the pen tip portion 42 of the core body 4 to protect the operation surface and improve the writing feel. However, the cover 43 is not limited to the cup shape. FIGS. 4A to 5B are views for describing variations of the core body 4.

As with the core body 4 described above, a core body 4A illustrated in FIG. 4A includes a main body portion 41A, a pen tip portion 42A, and a cover 43A. However, the cover 43A in this example is of an insertion type and includes an insertion portion 43Aa, which extends from an inner apex portion of the cover 43A, which is formed in a dome shape, toward an opening of the cover 43A through the axis. In this example, the insertion portion 43Aa is formed of the same material as a portion covering an outer side of the pen tip portion 42A of the cover 43A.

Figure 4A:
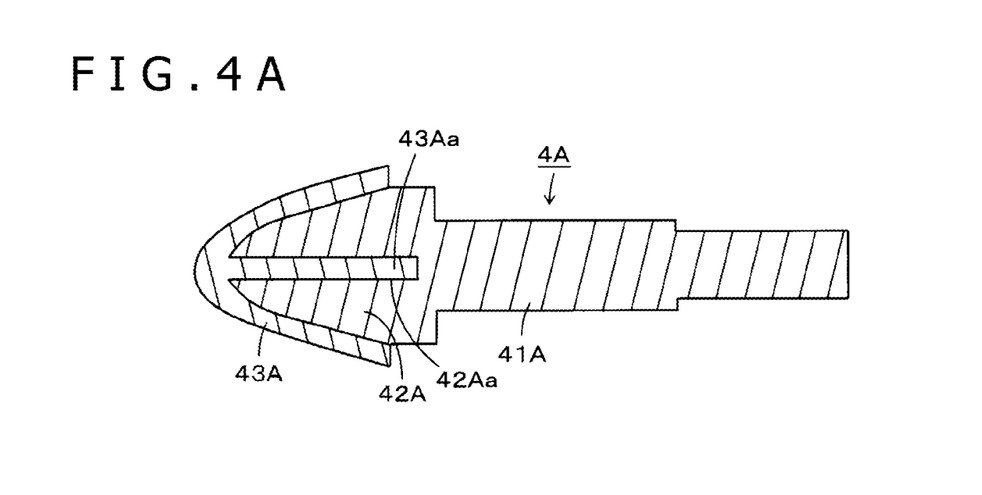
FIGS. 4A to 4C are views for describing variations of a core body for the electronic pen according to the embodiment of the present disclosure.

The insertion portion 43Aa may be processed to make the insertion thereof easier. For example, the insertion portion 43Aa may be made harder than the portion of the cover 43A covering the outer side of the pen tip portion 42A by compression. Further, the insertion portion 43Aa can be formed of a material different from that of the portion of the cover 43A covering the outer side of the pen tip portion 42A. Although the insertion portion 43Aa can have any of various shapes, the insertion portion 43Aa has a columnar shape in this example.

The pen tip portion 42A includes an insertion hole 42Aa, which is a hole into which the insertion portion 43Aa of the cover 43A is inserted. The insertion hole 42Aa extends from an apex portion through the axis toward the main body portion 41A. The length of the insertion hole 42Aa in the axial direction is the same as or larger than the length of the insertion portion 43Aa. Further, the diameter of the insertion hole 42Aa is the same as or slightly smaller than the diameter of the insertion portion 43Aa.

As illustrated in FIG. 4A, in a case of the core body 4A, the insertion portion 43Aa of the cover 43A is inserted into the insertion hole 42Aa, which is formed in the pen tip portion 42A, such that a surface on an inner side of the cover 43A (an inner surface of the cover 43A) is in contact with a surface on the outer side of the pen tip portion 42A (an outer surface of the pen tip portion 42A). In this way, the cover 43A can be attached to the pen tip portion 42A. In this case, since the insertion portion 43Aa is fitted into the insertion hole 42Aa, the cover 43A does not separate from or shift from the pen tip portion 42A. Moreover, there is no need to use an adhesive or the like. Therefore, the cover 43A attached to the pen tip portion 42A can be easily detached therefrom.

The shape of the insertion portion 43Aa is not limited to the columnar shape and can be formed as a columnar body having any of various cross-sectional shapes, such as a prismatic shape, in the direction intersecting the axial direction. Further, the insertion hole 42Aa can also have any of various shapes corresponding to the insertion portion 43Aa. Further, the insertion portion 43Aa and the insertion hole 42Aa do not need to have the same shape as long as the insertion portion 43Aa can be inserted into the insertion hole 42Aa and does not easily come off therefrom during use. Further, the length of each of the insertion portion 43Aa and the insertion hole 42Aa can be appropriately set such that the insertion portion 43Aa can be easily inserted into and detached from the insertion hole 42Aa and is not easily detached therefrom during use.

As with the core body 4 described above, a core body 4B illustrated in FIG. 4B includes a main body portion 41B, a pen tip portion 42B, and a cover 43B. However, the cover 43B in this example is of a fitting type and includes a projecting portion 43Ba. The projecting portion 43Ba, which projects inwardly, is formed in an opening of the cover 43B, which is formed in a dome shape. The projecting portion 43Ba is a ring-shaped portion formed so as to project along an inner edge of the opening of the cover 43B. In this example, the projecting portion 43Ba is formed of the same material as a portion of the cover 43B covering an outer surface of the pen tip portion 42B.

The pen tip portion 42B includes a ring-shaped groove portion 42Ba at the position where the projecting portion 43Ba of the cover 43B fits when the cover 43B is attached. The depth of the groove portion 42Ba (the depth in the direction intersecting the axis) is the same as the length of the portion of the projecting portion 43Ba projecting inwardly. Further, the length of the groove portion 42Ba in the axial direction is the same as or slightly smaller than the thickness of the projecting portion 43Ba in the axial direction. That is, as illustrated in FIG. 4B, the groove portion 42Ba is shaped such that the projecting portion 43Ba of the cover 43B fits precisely therein.

Figure 4B:
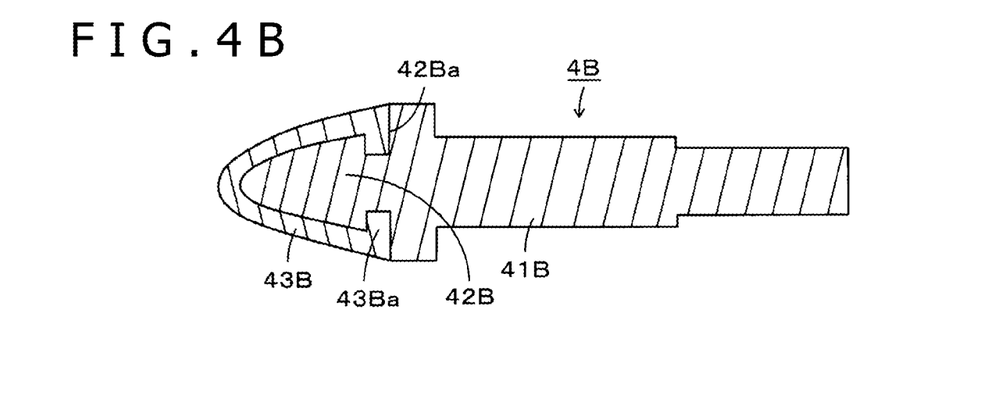

In this case, as illustrated in FIG. 4B, in a case of the core body 4B, the pen tip portion 42B is inserted from the opening of the cover 43B and covered with the cover 43B and the projecting portion 43Ba of the cover 43B is fitted into the groove portion 42Ba of the pen tip portion 42B. Accordingly, an inner wall surface of the cover 43B and an outer wall surface of the pen tip portion 42B on a pen tip side thereof can be in close contact with each other, and the cover 43B can be attached to the pen tip portion 42B. Since the projecting portion 43Ba is fitted into the groove portion 42Ba in this way, the cover 43B does not separate from or shift from the pen tip portion 42B. Moreover, there is no need to use an adhesive or the like. Therefore, the cover 43B attached to the pen tip portion 42B can be easily detached therefrom.

As with the core body 4 described above, a core body 4C illustrated in FIG. 4C includes a main body portion 41C, a pen tip portion 42C, and a cover 43C. The cover 43C in this example is also of a fitting type as with the core body 4B illustrated in FIG. 4B. However, unlike the core body 4B, the cover 43C is attached so as to cover the entire outer surface of the pen tip portion 42C. That is, the core body 4C includes a projecting portion 43Ca. The projecting portion 43Ca, which projects inwardly, is formed in an opening of the cover 43C, which is formed in a dome shape. That is, the projecting portion 43Ca is a ring-shaped portion formed so as to project along an inner edge of the opening of the cover 43C. In this example, the projecting portion 43Ca is formed of the same material as the other portions of the cover 43C.

Figure 4C:
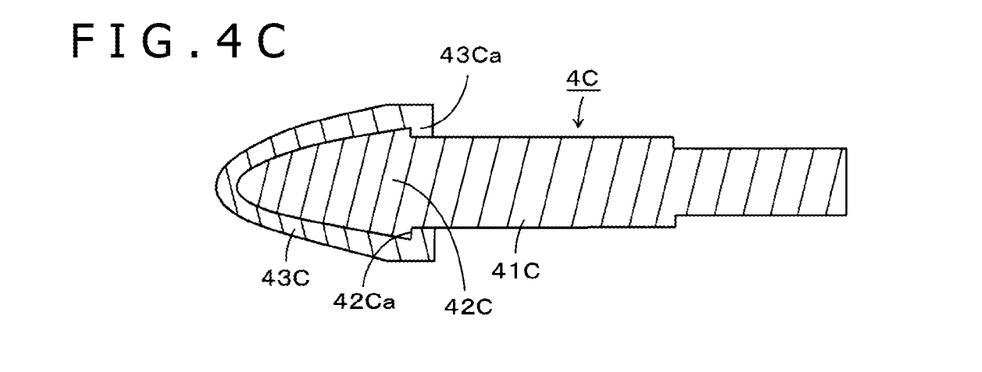

The pen tip portion 42C includes a ring-shaped projecting portion 42Ca at a boundary between the pen tip portion 42C and the main body portion 41C. The projecting portion 42Ca projects outward relative to the main body portion 41C. The length of a portion of the projecting portion 42Ca projecting in the direction intersecting the axis is the same as the length of a portion of the projecting portion 43Ca of the cover 43C projecting inwardly. Further, as illustrated in FIG. 4C, the shape of an inner space portion of the cover 43C is substantially the same as the shape of a portion of the pen tip portion 42C to which the cover 43C is attached. Accordingly, when the pen tip portion 42C is inserted from the opening of the cover 43C and covered with the cover 43C, the projecting portion 42Ca of the pen tip portion 42C and the projecting portion 43Ca of the cover 43C are fittingly engaged with each other since they project in opposite directions.

That is, as illustrated in FIG. 4C, in a case of the core body 4C, the pen tip portion 42C is covered with the cover 43C, and the projecting portion 43Ca of the cover 43C is engaged with the projecting portion 42Ca of the pen tip portion 42C. Accordingly, an inner wall surface of the cover 43C and an outer wall surface of the pen tip portion 42C can be in close contact with each other, and the cover 43C can be attached to the pen tip portion 42C. In this case, since the projecting portion 43Ca is engaged with the projecting portion 42Ca, the cover 43C does not separate from or shift from the pen tip portion 42C. Moreover, there is no need to use an adhesive or the like. Therefore, the cover 43C attached to the pen tip portion 42C can be easily detached therefrom. Needless to say, one of the inner space portion of the cover 43C and the portion of the pen tip portion 42C to which the cover 43C is attached may have a similar shape to the other and may be made slightly larger or smaller than the other to make them more closely contact with each other or give some margin.

Figure 5A:
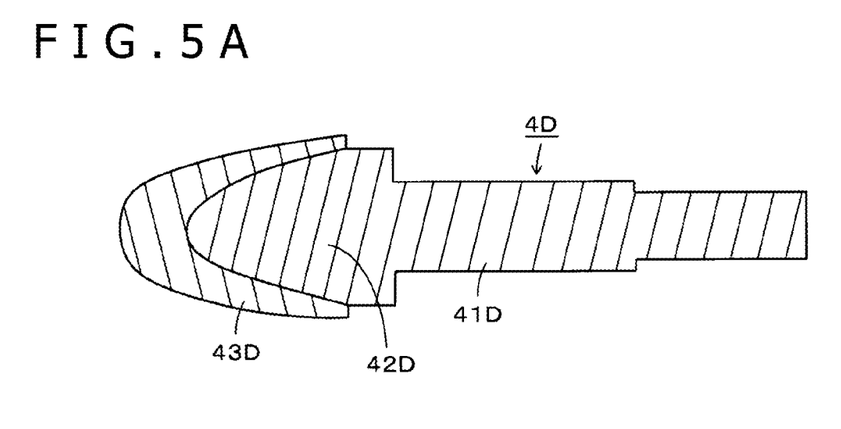
FIGS. 5A and 5B are views for describing variations of the core body for the electronic pen according to the embodiment of the present disclosure.
Figure 5B:
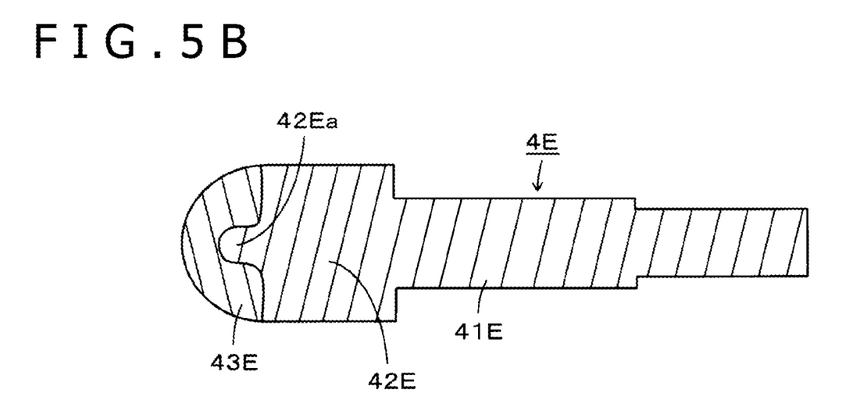

As with the core body 4 described above, a core body 4D illustrated in FIG. 5A includes a main body portion 41D, a pen tip portion 42D, and a cover 43D. The cover 43D in this example has a different shape from those of the covers 43, 43A, 43B, and 43C described above and has a thicker tip that mainly serves as a pen tip than those of the covers 43, 43A, 43B, and 43C. The other configurations of the core body 4D are substantially the same as those of the core body 4 described with reference to FIGS. 1 and 2. Therefore, as illustrated in FIG. 5A, it is also possible to increase the thickness of the tips of the covers 43, 43A, 43B, and 43C described above. That is, the covers 43, 43A, 43B, and 43C may have any of various shapes. For example, the covers 43, 43A, 43B, and 43C may have a thicker or thinner tip, a flat tip, or a thicker or thinner side surface.

As with the core body 4 described above, a core body 4E illustrated in FIG. 5B includes a main body portion 41E, a pen tip portion 42E, and a cover 43E. Contrary to the core body 4A illustrated in FIG. 4A, the pen tip portion 42E includes a protruding portion 42Ea in a central portion at a tip of the pen tip portion 42E. The cover 43E in this example includes a recessed portion in a central portion of an inner side of the cover 43E so as to correspond to the protruding portion 42Ea. This configuration increases a contact area when the cover 43E is attached to the pen tip portion 42E, thereby stabilizing the attachment of the cover 43E to the pen tip portion 42E. In this case, the cover 43E can be disposed at the tip of the pen tip portion 42E that typically comes into contact with an operation surface. In a case of the core body 4E illustrated in FIG. 5B, it is desirable that the cover 43E and the pen tip portion 42E adhere to each other by an adhesive or the like.

Another Example of Configurations of Portions of Core Body Other than Cover

In the core body 4 described with reference to FIGS. 1 to 3, the main body portion 41 and the pen tip portion 42 are integrally formed of a conductive material. Therefore, the entire core body 4 is hard and has high strength. Therefore, as described above, disposing the cover 43 can realize a soft pen tip. The same can be applied to the core bodies 4A, 4B, 4C, 4D, and 4E respectively described with reference to FIGS. 4A to 5B. However, portions other than the cover 43 may have various configurations. For example, a portion including the main body portion 41 and the pen tip portion 42 may include a core rod portion and a protective member that covers at least a side surface of the core rod portion. Hereinafter, another example of configurations of portions of the core body other than the cover will be specifically described.

Another Example of Configurations of Portions of Core Body Other Than Cover

Figure 6A:
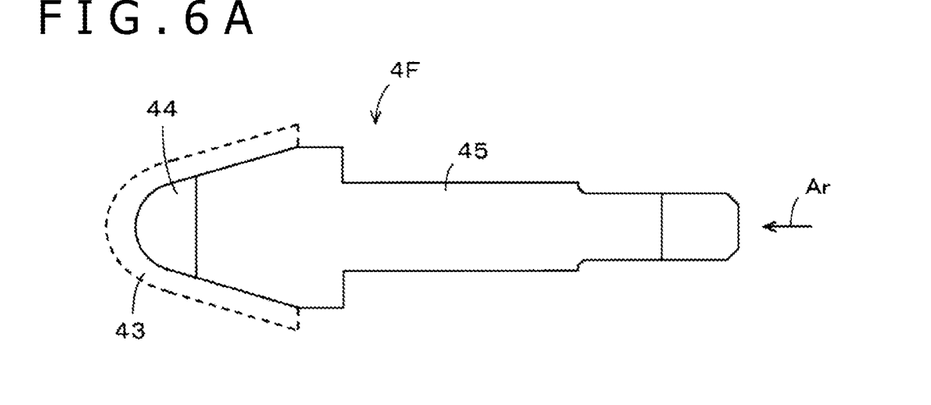
FIGS. 6A to 6C are views for describing another example of configurations of the core body for the electronic pen according to the embodiment of the present disclosure.
Figure 6B:
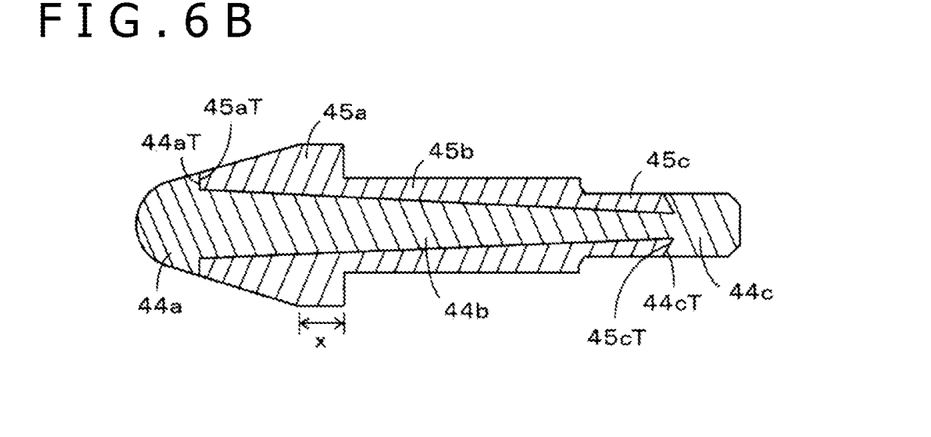
Figure 6C:
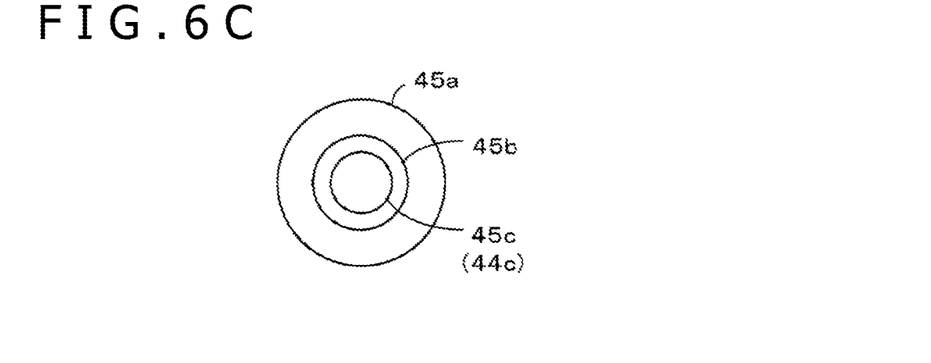

FIGS. 6A to 6C are views for describing another example of configurations of portions of the core body other than the cover. Specifically, FIG. 6A is an external view of a core body 4F. FIG. 6B is a sectional view of the core body 4F. FIG. 6C is a bottom view of the core body 4F. As illustrated in FIGS. 6A and 6B, the core body 4F in this example includes a core rod 44 and a protective member 45. In actual implementation, as indicated by a dotted line of FIG. 6A, the cover 43 is attached to a pen tip of the core body 4F. However, since this example is also characterized in the portions excluding the cover 43, the portions other than the cover will be mainly described below.

The core rod 44 has a conductive rod-shaped body. The core rod 44 in this example is formed by using a conductive elastomer. A conductive elastomer is a rubber to which conductivity is added by mixing conductive particles (carbon, metal powder, metal deposition powder, or the like) substantially uniformly in a certain mixture ratio with a highly insulating rubber material. Therefore, the core rod 44 is soft and has elasticity and realizes a pen tip with what is called a soft writing feel.

As illustrated in FIG. 6B, the core rod 44 includes a hemispherical tip portion 44a and a rear end portion 44c. The tip portion 44a protrudes from a tip of the protective member 45 and constitutes the pen tip. The rear end portion 44c protrudes from a rear end of the protective member 45 and constitutes an electric connection portion. A rod-shaped portion connecting the tip portion 44a and the rear end portion 44c serves as a middle portion 44b. The middle portion 44b has a tapered shape that tapers from the tip portion 44a toward the rear end portion 44c.

As illustrated in FIGS. 6A and 6B, the protective member 45 covers a side surface of the middle portion 44b excluding the tip portion 44a and the rear end portion 44c of the core rod 44 to protect the core rod 44. In this example, the protective member 45 is formed of polycarbonate. Polycarbonate is a kind of thermo-reversible plastic and has a property that becomes soft and moldable into a desired shape when heated and solidified when cooled.

Therefore, when the core body 4F is formed, the core rod 44, which is formed of a conductive elastomer, is first molded. Then, polycarbonate is injected into the same mold as the core rod 44 (primary side) to form the protective member 45 (secondary side). By what is called two-color molding, the core body 4F in which the protective member 45 is formed on the side surface of the middle portion 44b of the core rod 44 can be formed. Two-color molding is a method of molding a member and also called different-material molding or double molding. As illustrated in FIG. 6B, the protective member 45 includes three portions having different widths in the direction intersecting the axial direction: a first protective portion 45a, a second protective portion 45b, and a third protective portion 45c.

As illustrated in FIG. 6B, the first protective portion 45a is a portion formed on a pen tip side of the core body 4F. The first protective portion 45a has a tapered shape that tapers toward the pen tip. A predetermined range portion x from a rear end of the first protective portion 45a toward the pen tip has the largest width in the core body 4F in the direction intersecting the axial direction. However, the width of the predetermined range portion x in the direction intersecting the axial direction is slightly smaller than the width (diameter) of the opening of the front cap 22. With this configuration, the core body 4F can be inserted into the case 2 through the opening of the front cap 22 without the first protective portion 45a blocking the insertion.

Then, when the electronic pen 1 in which the core body 4F is mounted in the case 2 is used for writing operation, a pen pressure is applied to the core rod 44 in the axial direction and a force is also applied thereto in the direction opposite to the moving direction of the electronic pen 1. When the force is large, an inner wall of the opening of the front cap 22 and an outer wall of the predetermined range portion x of the first protective portion 45a of the protective member 45 of the core body 4F come into contact with each other. With this configuration, it is possible to prevent an excessive load from being applied to the core rod 44 during the writing operation. This configuration, therefore, prevents the core rod 44 from being excessively bent and making writing difficult and also prevents the core rod 44 from being damaged.

The second protective portion 45b is a portion that continues to a rear end of the first protective portion 45a. The width of the second protective portion 45b in the direction intersecting the axial direction is smaller than the width of the rear end of the first protective portion 45a and larger than the width of the third protective portion 45c described later in the direction intersecting the axial direction. Therefore, as illustrated in the bottom view of FIG. 6C, the core body 4F includes the three portions having different diameters as viewed from the direction indicated by an arrow Ar of FIG. 6A. Regarding a relation among the diameters of the respective protective portions, the first protective portion 45a has the largest diameter, the second protective portion 45b has the second largest diameter, and the third protective portion 45c has the smallest diameter. The second protective portion 45b protects a central portion of the middle portion 44b of the core rod 44 in the axial direction.

The third protective portion 45c is a portion that continues to a rear end of the second protective portion 45b and protects a portion where the core rod 44 is the thinnest. As illustrated in FIGS. 6B and 6C, the width of the third protective portion 45c in the direction intersecting the axial direction is substantially the same as the width of the rear end portion 44c of the core rod 44 in the direction intersecting the axial direction. Further, the third protective portion 45c of the protective member 45 and the rear end portion 44c of the core rod 44 are inserted into and held by the core body holding member 53 of the shaft portion 52 as illustrated in FIG. 2.

Further, since the tip portion 44a of the core rod 44 protrudes from the protective member 45, the tip portion 44a of the core rod 44 constitutes the pen tip, thereby realizing an electronic pen with a soft writing feel. Further, the rear end portion 44c of the core rod 44 also protrudes from the protective member 45. The rear end portion 44c comes into contact with the core body holding member 53, which is formed of a conductive material, and can receive a signal from the signal transmitter 8s. That is, the rear end portion 44c of the core rod 44 constitutes an electric connection end for receiving a signal supplied from the signal transmitter 8s. With this configuration, the signal from the signal transmitter 8s formed under the control of the control IC 10 can be transmitted to a position detection sensor through the core rod 44.

The material of the core rod 44 is not limited to the conductive elastomer. The core rod 44 can also be formed of, for example, resin such as polyoxymethylene or polyacetal (POM) mixed with conductive particles such as metal powder or carbon, or felt to which a conductive material such as conductive particles is added. In this way, the core rod 44 can be formed of any of various conductive materials. Moreover, it is possible to realize a pen tip with a soft writing feel by using a relatively soft material such as felt (non-woven fabric).

The material of the protective member 45 is not limited to polycarbonate. The protective member 45 can also be formed of acrylic resin called organic glass or the like together with polycarbonate. In this way, the protective member 45 is thermo-reversible and forms the core body 4F together with the core rod 44 by what is called double molding. The protective member 45 can be formed of any of various materials that can protect the core rod 44 while maintaining a certain degree of hardness in a solidified state.

In this way, as indicated by the dotted line of FIG. 6A, attaching the cover 43 to a basic constituent portion of the core body 4F including the core rod 44 and the protective member 45 can configure a core body for an electronic pen with a softer pen tip. The core body 4F with the cover 43 attached thereto can be reliably used not only with an existing tablet terminal but also with a foldable terminal. Moreover, in a case of the core body 4F, a linear characteristic of the indicated position on the position detection sensor side can be improved.

As described with reference to FIGS. 6A and 6B, the core body for the electronic pen having any of various shapes and including the core rod and the protective member can be formed. In this case, the core rod has been described as having the tip portion, the rear end portion, and the middle portion having a tapered shape that tapers from the tip portion toward the rear end portion. However, the present disclosure is not limited thereto and the middle portion does not need to have the tapered shape. Therefore, the core rod can have any of various shapes. Further, it suffices that the protective member protects the middle portion of the core rod. More specifically, it suffices that the protective member includes the first protective portion that protects the core body from a force applied in the direction opposite to the moving direction at the time of writing, the second protective portion that protects most of the middle portion, and the third protective portion that protects the rear end side of the core rod and that forms a fitting portion fitted to the core body holding member 53.

Needless to say, the protective member may cover the entire core rod to form the basic constituent portion of the core body, and the cover may be disposed on the pen tip of this basic constituent portion. Further, any of the covers 43A, 43B, 43C, and 43D in the modes respectively described with reference to FIGS. 4A to 5A may be disposed on the core body 4F illustrated in FIGS. 6A to 6C.

Advantageous Effects of Embodiment

The electronic pen 1 according to the above-described embodiment includes the shock-absorbing mechanism that, when a pen pressure applied to the core body 4 becomes 300 gf or more, absorbs the pen pressure. Accordingly, when the pen pressure is in the range of 0 gf to less than 300 gf, it is possible to appropriately detect the pen pressure and prevent a load of 300 gf or more from being applied to an operation surface of an electronic device such as a tablet PC. This configuration can realize an electronic pen that can be reliably used even with a foldable terminal without applying a large pressure to an operation surface of the foldable terminal and that can appropriately detect a pen pressure.

Further, the cover 43 is disposed on the pen tip portion 42 of the core body 4. This configuration can realize an electronic pen that includes a softer pen tip close to the feel of a user's fingertip and that can be reliably used not only with an existing tablet terminal but also with a foldable terminal. Further, even if any of the covers 43, 43A, 43B, 43C, and 43D is disposed, any of the core bodies 4, 4A, 4B, 4C, 4D, 4E, and 4F can realize functions as a core body for an electronic pen by portions other than the cover. That is, any of the core bodies 4, 4A, 4B, 4C, 4D, 4E, and 4F can maintain the performance as a core body for an electronic pen.

Further, any of the covers 43, 43A, 43B, 43C, and 43D can be detachably attached to the pen tip of the basic constituent portion of the core body, that is, the pen tip of the portion including the main body portion 41 and the pen tip portion 42 and the pen tip of the portion including the core rod 44 and the protective member 45. With this configuration, even if the covers 43, 43A, 43B, 43C, and 43D deteriorate, replacement is possible. Therefore, the basic constituent portion of the core body can last longer.

Modifications

In the above-described embodiment, the set load of the piston spring 54 has been described as 300 gf. However, the present disclosure is not limited thereto. Depending on the strength of an operation surface of an electronic device to be used, the set load of the piston spring 54 can be any value. Further, the shaft portion 52, the core body holding member 53, the piston spring 54, and the cylinder portion 55 of the electronic pen 1 according to the above-described embodiment need only be formed of conductive materials and can be formed of any of various conductive materials as long as they fulfill their functions.

Further, the materials of the components constituting the core bodies 4, 4A, 4B, 4C, 4D, 4E, and 4F in the above-described embodiment are not limited to those described above. Each of these components can be formed of any of various materials that can fulfill its function and purpose thereof. In particular, each of the covers 43, 43A, 43B, 43C, and 43D can be formed of any of various materials that can be compressed and expanded and that do not damage a display screen of what is called a foldable terminal when it contacts the display screen as an operation surface during use. For example, the covers 43, 43A, 43B, 43C, and 43D may be formed of a conductive elastomer to ensure good conductivity of the overall core bodies 4, 4A, 4B, 4C, 4D, 4E, and 4F and, at the same time, soften a writing feel.

Further, the method of attaching the cover to the pen tip portion is not limited to the ones described with reference to FIGS. 4A to 5B. The cover can be attached to the pen tip portion by any of various methods that can ensure that the cover is attached to the pen tip portion without coming off or shifting during use. Further, the core bodies 4, 4A, 4B, 4C, 4D, 4E, and 4F can be configured in various sizes depending on the electronic pen actually used.

The size of each of the pen tip portions 42, 42A, 42B, 42C, and 42D and the size (mainly the thickness) of each of the covers 43, 43A, 43B, 43C, and 43D are determined to become a predetermined size in a state in which the cover disposed on the pen tip portion is contracted to its limit. This prevents such an inconvenience that the cover becomes thicker than necessary.

Further, the insertion hole 42Aa of the core body 4A described with reference to FIG. 4A serves as a holding portion that holds the insertion portion 43Aa of the cover 43A. Further, the groove portion 42Ba described with reference to FIG. 4B serves as a holding portion that holds the projecting portion 43Ba of the cover 43B. The projecting portion 42Ca described with reference to FIG. 4C serves as a holding portion that holds the projecting portion 43Ca of the cover 43C.

It is to be noted that the embodiment of the present disclosure is not limited to the foregoing embodiment, and that various changes can be made without departing from the spirit of the present disclosure.

The invention claimed is:
1. An electronic pen comprising:
   a rod-shaped core body having conductivity;
   a pen pressure transmitter which is connected to the core body and has conductivity and which, in operation, transmits a pen pressure applied to the core body to a pen pressure detector; and
   a signal transmitter which, in operation, generates a signal to be transmitted from the core body,
   wherein the pen pressure transmitter includes a shock-absorbing mechanism which, in operation, when the pen pressure applied to the core body has a predetermined value or more, absorbs the pen pressure,
   wherein the shock-absorbing mechanism of the pen pressure transmitter includes:
      a cylinder portion connected to the pen pressure detector,
      a shaft portion including a piston portion inserted into the cylinder portion and a core body holding portion,
      a core body holding member fixed to the core body holding portion of the shaft portion and keeping a rear end side of the core body held inside the core body holding portion, and
      an elastic body disposed between the cylinder portion and the core body holding portion of the shaft portion, and
   wherein the elastic body keeps a constant distance between the cylinder portion and the shaft portion while the pen pressure applied to the core body does not exceed the predetermined value, and
   wherein the signal from the signal transmitter, in operation, is supplied to the core body through the pen pressure transmitter and transmitted to an outside of the electronic pen through the core body.

2. The electronic pen according to claim 1, wherein, when the pen pressure applied to the core body exceeds the predetermined value, the piston portion of the shaft portion is further inserted into the cylinder portion while causing the elastic body to contract and causes the core body to be displaced in a direction in which the pen pressure is applied and which corresponds to an axial direction.

3. The electronic pen according to claim 1, wherein the elastic body is a conductive spring.

4. The electronic pen according to claim 1, wherein the pen pressure transmitter is configured, as a pen pressure transmission unit, with the cylinder portion, the shaft portion in which the core body holding member is disposed inside the core body holding portion, and the elastic body which are housed in a predetermined casing.

5. The electronic pen according to claim 1, wherein:
the core body includes a rod-shaped main body portion and a pen tip portion which is located at one tip of the main body portion and which, in operation, contacts an operation surface during use, and
a cover formed of a material capable of compression and expansion is disposed on an outer surface of the pen tip portion on a side which, in operation, contacts the operation surface during use.

6. The electronic pen according to claim 5, wherein the pen tip portion includes a holding portion that holds the cover.

7. The electronic pen according to claim 5, wherein the cover is formed of a sponge or a rubber.

8. The electronic pen according to claim 5, wherein the cover is formed of a conductive material.

9. The electronic pen according to claim 5, wherein the cover is formed of a conductive elastomer.

* * * * *